May 12, 1959 S. HANSEN 2,886,066
BELLOWS UNITS FOR FLEXIBLE PRESSURIZED CONDUITS
Filed May 7, 1957 2 Sheets-Sheet 1

INVENTOR:
Siegfried Hansen
By Robert H. Lenz
Attorney

INVENTOR
Siegfried Hansen

Robert H. Lentz
Attorney

United States Patent Office 2,886,066
Patented May 12, 1959

2,886,066

BELLOWS UNITS FOR FLEXIBLE PRESSURIZED CONDUITS

Siegfried Hansen, Los Angeles, Calif., assignor to Litton Industries of California, Beverly Hills, Calif.

Application May 7, 1957, Serial No. 657,608

4 Claims. (Cl. 138—49)

This invention relates to bellows units for flexible pressurized conduits, and more particularly to an improved form of bellows element which has a negligibly small axial spring when flexed.

In the prior art it has long been known that bellows tubing is especially applicable to flexible conduits for conveying or transferring fluids under pressure. In its most common forms the bellows tubing is composed of either rubberized fabric or thin-walled metal tubing whose walls are undulated to provide a series of closely spaced convolutions whose cross-sectional configuration is substantially sinusoidal. While bellows elements of the foregoing types perform satisfactorily in most applications, there are certain instances where the inherent characteristics of conventional bellows tubing may severely restrict its utility.

More specifically, it is known that unrestrained bellows tubing will normally tend to elongate and straighten when subjected to a pressure differential such that the internal pressure exceeds the external pressure, and will thus present a restoring force which opposes flexibility of the bellows unit. Although this characteristic of bellows tubing is of little consequence when the bellows is employed for interconnecting relatively massive objects, such as in refueling vessels at sea, it is intolerable if the flexible conduit is to retain substantially complete flexibility over its bending range even when subjected to pressure.

As disclosed in copending U.S. patent application Serial No. 536,596, filed September 26, 1955, for "Flexible Pressurized Conduits" by the present inventor, the flexibility of a pressurized bellows unit may be retained by longitudinally constraining the bellows unit, as with a system of cables and pulleys for example, so that the bellows will deflect to a toroidal configuration when subjected to a bending moment. The internal volume of the bellows unit is thus maintained substantially constant, and hence in theory, bending may be accomplished without the expenditure of work. An improved form of bellows constraining structure is also shown in copending U.S. patent application Serial No. 657,581, filed May 7, 1957, for "Flexible Pressurized Conduit" by Allan D. Le Vantine, wherein a series of intercoupled gimbal rings is employed to maintain constant the internal volume of the bellows.

Although each of the foregoing structures has succeeded in providing pressurized conduits whose flexibility is greatly increased, their use with conventional bellows units of the form described hereinabove is still restricted by the inherent resiliency of conventional bellows tubing. More particularly, it is well known that even unpressurized bellows tubing will assume a normal configuration to which it will try to contract when stretched and to which it will try to expand when compressed. It is also clear that when a section of bellows tubing is longitudinally constrained in the manner taught in the above-referenced copending patent application, the center length of the bellows tubing is maintained constant at all times thereby to maintain constant the internal volume of the bellows. Nevertheless, as the bellows unit is bent to a toroidal configuration, each convolution thereof must of necessity expand on one side over an arc of 180° and contract in a conjugal manner over the remaining 180° of arc. Accordingly, the inherent resiliency of conventional bellows tubing will tend to contract the bellows on the side which has been extended and concomitantly to expand the bellows on the side which has been compressed, thereby exerting a straightening force which opposes bending of the bellows unit.

It may also be shown that still another straightening force is operative in conventional bellows tubing when the internal pressure exceeds the external pressure. More particularly, it will be recognized that the force tending to elongate each convolution of the bellows is a function of the longitudinally projected area of the bellows. Since bending of the bellows results in a decrease in the peak-to-peak height of the bellows convolutions on the side which is extending and an increase in the peak-to-peak height of the bellows convolutions on the side which is contracting, it is also clear that the longitudinally projected area of each bellows convolution is of varying width when the bellows is bent. Inasmuch as the smallest inside diameter of the convolutions is maintained constant by the annular supporting members circumscribing the bellows, it will be recognized that the changes in the projected area of the convolutions with bending will result in a force differential being created by the internal pressure which will tend to straighten the bellows and oppose flexures thereof.

The present invention overcomes the foregoing deficiencies of conventional bellows tubing by providing a bellows unit which may be flexed in response to bending moments without exerting a restoring force, or stated differently, which eliminates the spring moment customarily associated with the bellows units of the prior art. In accordance with the basic concept of the invention, the bellows unit herein disclosed comprises a tubular section of flexible material, such as rubberized fabric for example, a plurality of annular members which circumscribe the tubular section at spaced intervals and are affixed thereto, and means for intercoupling the annular members in a manner such that the distance between adjacent annular members is less than the spacing between adjacent members along the surface of the tubular section whereby a portion of the tubular section is forced to cuff or pleat upon the annular members.

More specifically, in accordance with the preferred embodiment of the invention each of the annular members has a radially extending flange portion and a longitudinal portion which extends substantially parallel to the centroidal axis of the tubular section of flexible material. After the annular members have been affixed to the tubular section they are then suspended within a volume-constraining linkage system which shortens the distance between adjacent annular members and thereby forces the additional bellows material between the annular members to cuff or pleat over the longitudinally extending portions thereof. As will be disclosed in more detail hereinbelow, these cuffs are preferably formed to encompass only one-half of the longitudinal portion of each annular member to thereby provide a reservoir of additional bellows material which permits adjacent members to be moved apart, and which simultaneously provides room to permit additional bellows material to be cuffed thereover. Since flexure of the conduit function to move adjacent annular members toward each other over an arc of 180° and away from each other over the remaining 180° of arc, it will be appreciated that cuffs which normally cover only one-half of the annular members will function to permit maximum bending of the conduit in which the bellows tubing of the invention is employed.

As hereinafter described, the volume constraining linkage system employed with the bellows tubing of the invention may merely comprise a series of non-stretchable fabric strips which are affixed to the cuffs of material and which longitudinally traverse the bellows at two points spaced 180° apart. On the other hand, more complex linkage systems such as a cable suspension system or a series of intercoupled gimbal rings may be employed for longitudinally constraining the bellows unit, these latter two forms of linkage systems being disclosed in the above-referenced copending patent applications.

It is, therefore, an object of the invention to provide bellows units for flexible pressurized conduits which are substantially free from restoring spring moments.

Another object of the invention is to provide bellows units wherein the convolutions are formed by cuffing or pleating the bellows material over annular members which circumscribe the bellows at spaced intervals.

It is a further object of the invention to provide bellows units for flexible pressurized conduits wherein cuffs or pleats are formed in a tubular section of flexible and non-stretchable rubberized fabric to thereby provide convolutions which permit extension or contraction of the conduit between any two points on the lateral periphery thereof.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
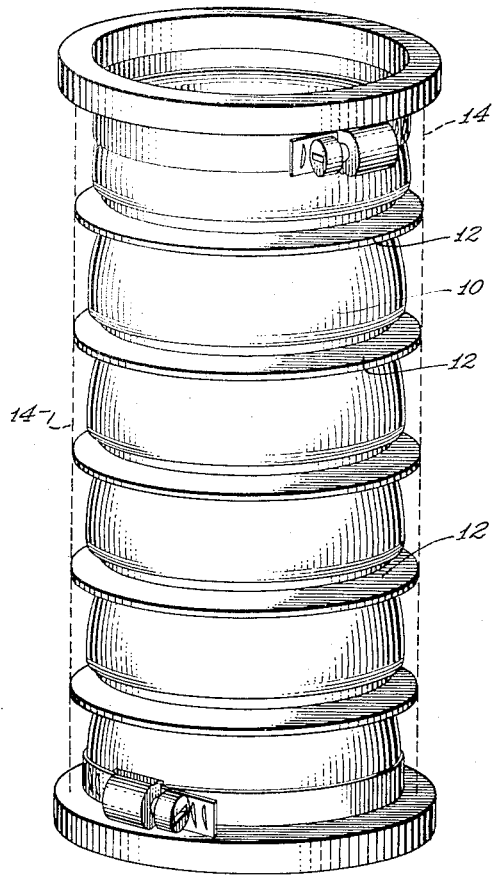
Fig. 1 is a perspective view of a pressurized flexible conduit employing the novel bellows unit of the invention.

With reference now to the drawings, wherein like or corresponding parts are designated by the same reference characters throughout the several views, there is shown in Fig. 1 a flexible pressurized conduit which includes as an integral part thereof a bellows unit constructed in accordance with the teachings of the present invention. As shown in Fig. 1 the conduit comprises a bellows unit 10, which may be constructed from a cylinder of rubberized fabric for example, a plurality of annular members 12 which circumscribe the bellows unit at spaced intervals and cooperate therewith in the manner described hereinbelow to provide a cuff-like reservoir of bellows material between adjacent annular members, and a linkage system, schematically indicated by the dotted lines 14, for hingedly intercoupling the annular members and longitudinally constraining the bellows unit to a constant volume so that the bellows may be flexed in response to bending moments without the expenditure of work.

In order to most clearly set forth the basic concepts of the present invention, consideration will be given first to the form of the bellows unit and the manner in which the annular members 12 function as an integral part thereof. Thereafter several different forms of longitudinal constraining devices will be described in order to describe most precisely the mode of operation of the bellows unit of the invention.

Figure 2:
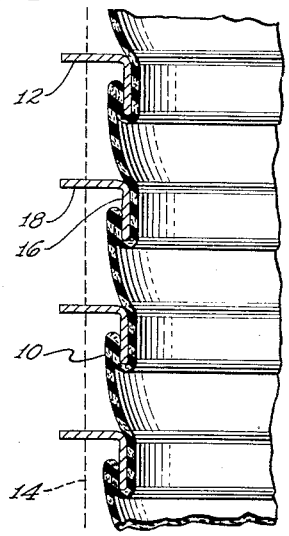
Fig. 2 is a cross-sectional view of the bellows unit of Fig. 1 illustrating the manner in which the bellows tubing is cuffed or pleated to permit flexure thereof.

With reference now to Fig. 2, there is shown a cross-sectional view of the bellows unit 10 of Fig. 1 illustrating the manner in which the annular members 12 serve to provide convolutions therein. As shown in Fig. 2, each of the annular members 12 is preferably L-shaped in cross-sectional configuration and includes a longitudinal portion designated 16 which is substantially parallel to the central axis of the bellows, and a radially extending flange portion 18 which functions as a stiffener to maintain the circular configuration of the annular members and which may, in addition, be employed in conjunction with the longitudinal constraining linkage to be hereinafter described.

The bellows unit per se is preferably formed from a cylinder or tube of rubberized fabric, the fabric preferably being a relatively non-stretchable material which is easily flexed, such as nylon for example, so that the resulting tubular member constructed therefrom is also relatively non-stretchable. Dimensionally the diameter of the fabric tube is approximately equal to or slightly larger than the inside diameter of the annular supporting members to be employed in cooperation therewith, and has an overall length approximately one and one-half times the overall length of the flexible pressurized conduit in which it is to be utilized.

In the construction of the bellows unit the annular supporting members are first positioned over the tube of rubberized fabric at evenly spaced intervals which are slightly larger than the distance between adjacent annular members in the completed flexible conduit, after which the annular members are cemented in place with a suitable adhesive, such as polychloroprene cement. More particularly, in the preferred method of practicing the invention the annular supporting members are spaced from each other along the surface of the tube such that the distance between the flange portions of adjacent members is approximately three times the axial length of the longitudinally extending portion 18 of each member, or in other words, so that the length of unsupported tubing between adjacent annular members is substantially twice the axial length of the longitudinally extending portion of each annular member.

After the annular members have been cemented in place over the tube of rubberized fabric in the above-described manner, the longitudinal constraining linkage system is coupled to the bellows unit and functions to to shorten the distance between the adjacent rings to one-half its former value so that adjacent annular members are separated by a distance substantially equal to the length of the longitudinal portion 18 of the annular members. The additional material between adjacent annular members is thus forced back over the longitudinal portion of one of the annular members, as shown in Fig. 2, thereby forming a cuff or pleat of bellows tubing thereover. It should be noted here that it may be desirable to apply positive pressure to the inside of the bellows unit when it is being suspended within the volume constraining linkage system 14, since the rubberized fabric will be stretched slightly thereby and, accordingly, will form the desired cuffs or pleats more readily.

Consider now the dimensions of the cuff on each annular member relative to the length of the longitudinal portion 16 of the member, and the reason for thus disposing the bellows tubing thereover. It will be recalled that the length of unsupported tubing between adjacent rings is approximately twice the length of the longitudinal portion of an annular member, and that after assembly of the conduit the length of the member also corresponds to the distance between adjacent annular members. Accordingly, each cuff or pleat formed in the bellows unit extends back over approximately one-half the length of the longitudinal portion of its associated annular member.

In the operation of flexible pressurized conduits employing the novel bellows unit of the invention, the cuffs or pleats in the bellows provide a reservoir of bellows material when adjacent annular members are moved apart beyond their normal separation, and provide room for additional bellows material to be cuffed or pleated when adjacent annular members are moved toward each other. As will be understood from the description of the volume constraining linkage systems set forth hereinbelow, in operation adjacent annular members are free to rotate relative to each other in response to bending moments, but are constrained from moving translationally with respect to each other. Consequently flexure of the conduit results in adjacent annular members moving toward each other over 180° of arc, and away from each other in a conjugal manner over the remaining 180° of arc. It will be recognized, that in response to any given bending moment one-half of each annular member will serve as a reservoir of additional bellows material to permit extension of the bellows on one side, while the other half of each annular member functions to store bellows material to permit contraction of the bellows on the side diametrically opposite.

It should be noted here that the above-described disposition of the bellows cuffs over approximately one-half of the external longitudinal area of the annular members is only to be preferred, and is not intended to limit the scope of the invention. The reason for preferring the foregoing arrangement, of course, is that it permits maximum bending freedom for any given size annular member inasmuch as the reservoir of material is emptied on one side of the bellows at the same time that the maximum amount of material is cuffed over the opposite side of the annular members.

Figure 3A:
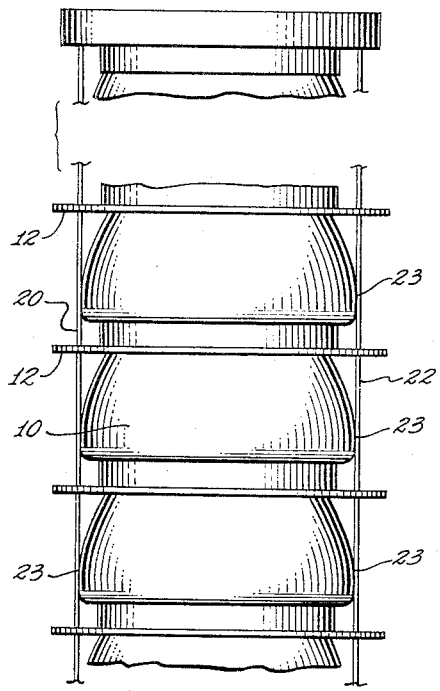
Figs. 3a, 3b and 3c are plan views illustrating three different forms of volume constraining linkage systems which may be employed in the conduit of Fig. 1.

Consider now the form of the volume-constraining linkage system 14 which functions to permit flexure of the bellows unit. As shown in Fig. 3a, in its simplest form the linkage system may comprise a pair of non-stretchable fabric strips 20 and 22 which traverse the bellows unit at diametrically opposing points, the strips being cemented to the convolutions of the bellows at the points 23 substantially as shown. It will be recognized that the flanges on the annular members should be notched to permit passage of the fabric strips if this particular form of linkage system is to be utilized. In addition, it is also clear that the identical result could be accomplished, if desired, by attaching the fabric strips to the flange portions of the annular members at diametrically opposite points in lieu of cementing the strips to the bellows convolutions.

In operation the linkage system of Fig. 3a delimits the length of the conduit, and permits flexure of the bellows in a plane perpendicular to the plane of the fabric strips by maintaining constant the internal volume of the bellows. Although this particular form of linkage system may perform satisfactory in certain applications, it is nevertheless limited in that flexure is restricted to one plane of movement.

Figure 3B:
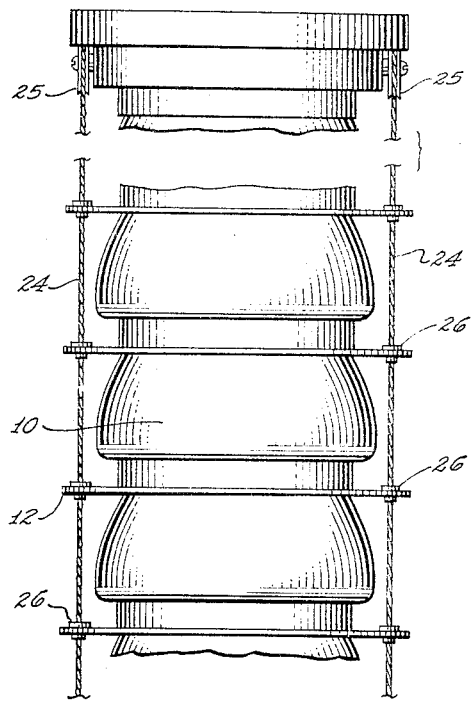

Referring now to Fig. 3b there is shown still another volume-constraining system which is of the form shown and described in the above-referenced U.S. patent application Serial No. 536,596 by the present inventor. As shown in Fig. 3b this linkage system comprises a cable 24 which traverses the bellows in at least two diametrically opposed points and is suspended, as by pulleys 25, at one or both ends thereof. In addition, the linkage system also includes means for laterally constraining the cables to the side of the bellows unit, this function being performed in the system of Fig. 3b by a plurality of Teflon grommets 26 which are fitted in apertures in the annular members and through which the cable 24 is threaded.

In operation the linkage system of Fig. 3b permits universal bending of the bellows unit, since the application of a bending moment in the plane of cable 24 results in a foreshortening of the cable run on one side of the bellows and a conjugal lengthening of the cable run on the opposite side. Bending moments in the plane perpendicular to the plane of the cable, of course, flex the bellows in the same manner described hereinabove with respect to Fig. 3a.

Figure 3C:
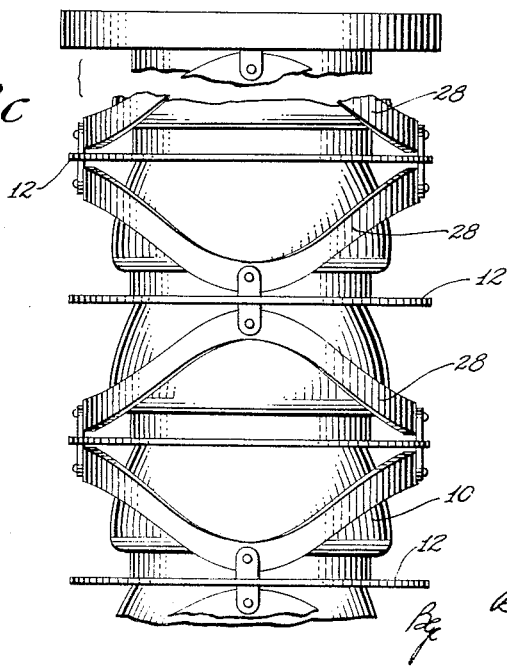

Still another form of linkage system which may be employed with the novel bellows unit of the invention is shown in Fig. 3c, this linkage system being of the form disclosed in the above-identified copending U.S. patent application Serial No. 657,581 by Allan D. Le Vantine. The system comprises a series of intercoupled gimbal rings 28 which permit adjacent annular members to be rotated with respect to each other about two mutually orthogonal pivot axes. The fundamental mode of operation of this particular linkage system is substantially the same as that of the linkage system of Fig. 3b in that both systems permit universal flexure and constrain the bellows to bend to a substantially toroidal configuration to thereby maintain constant its internal volume. However, the linkage system of Fig. 3c is preferred over the linkage system of Fig. 3b owing to the fact that it is sounder structurally and is substantially free of frictional forces. Moreover the spacing between annular members along the centroidal axis of the bellows is fixed by the rigid gimbal rings in the embodiment of Fig. 3c, whereas a certain amount of translational movement is possible between adjacent annular members in the embodiment of Fig. 3b.

Regardless of which form of constraining linkage is employed with the bellows of the invention, it will be recognized that each convolution of the bellows will remain in the cuffed position to which it is moved by a bending movement, and will not exert a spring moment tending to restore the bellows to its straight or normal position. Stated differently, straightening forces created in the convolutions of a conventional bellows by changes in the projected area in a radial plane of the convolutions, and by the inherent resiliency of the material, are eliminated by the novel bellows unit of the invention. Accordingly, a flexible pressurized conduit employing the bellows unit herein-disclosed will retain the configuration to which it is bent without requiring the use of force to hold it in this position, and moreover, may be bent or flexed to still other configurations with minimal expenditure of work.

It is to be understood, of course, that various alternatives and modifications could be made in the bellows unit herein-disclosed without departing from the invention. For example, alternate annular supporting members could be T-shaped in cross-sectional configuration so that additional bellows material would be cuffed over the supporting member from both ends. Accordingly, it is to be expressly understood that the spirit and scope of the invention are to be limited only by the spirit and scope of the appended claims.

What is claimed as new is:

1. In a flexible pressurized conduit, a bellows unit which may be flexed without exerting a restoring moment, said bellows unit comprising: at least first, second and third annular members, each of said members having a longitudinally extending portion of predetermined length; and a flange portion extending radially from one end thereof; linkage means for hingedly intercoupling said annular members in series to permit universal movement of adjacent members with respect to each other and for spacing adjacent annular members a predetermined average distance apart; a cylindrical section of flexible non-porous material having a diameter substantially equal to the inside diameter of said annular members; and means for affixing said annular members around said tubular section at spaced intervals, the length of said section between adjacent annular members exceeding said predetermined distance by said predetermined length to permit said tubular section to form a cuff extending approximately half way back over the external periphery of the longitudinal portion of each of said annular members when the interior of said section is subjected to a pressure higher than the external pressure.

2. A flexible pressurized conduit, said conduit comprising: a tubular section of flexible non-porous material, said tubular section having a plurality of cuffs formed therein at equally spaced intervals; a pair of annular end members affixed to the ends of said tubular section; a plurality of intermediate annular members corresponding respectively to said plurality of cuffs in said tubular section, each of said intermediate annular members circumscribing said tubular section and having a longitudinal portion which extends into the corresponding cuff in said tubular section, the length of said longitudinal portion of said annular members being longer than the length of said cuffs; and means for intercoupling said annular end members and said intermediate annular members to maintain substantially constant the distance between said annular end members along the centroidal axis of said tubular section and to permit universal movement of said intermediate annular members relative to adjacent annular members.

3. In a flexible pressurized conduit capable of being easily flexed when subjected to a pressure differential, the combination comprising: a flexible tubular section of bellows material; at least three annular members circumscribing said tubular section at uniformly spaced points along the length thereof, each of said members laterally constraining said tubular section to a substantially constant circular cross-sectional area and having a longitudinal portion extending parallel to the axis of said tubular section, said tubular section being cuffed over at least a portion of the longitudinal extending portions of said annular members; and linkage means connected to said annular members and forming a skeletal structure therewith for maintaining substantially constant the distance between adjacent annular members along the axis of said tubular section and for permitting universal movement between adjacent anular members, whereby said cuffs, forming the convolutions of a bellows unit, permit adjacent annular members to move apart over 180° of arc and to move toward each other over the remaining 180° of arc.

4. A flexible pressurized conduit substantially free from spring moments, said bellows unit comprising: a tubular section of flexible and relatively non-stretchable rubberized fabric; first, second and third annular members circumscribing said tubular section at spaced intervals and affixed thereto, each of said members having a radially extending flange portion and a longitudinally extending base portion to the inner surface of which said tubular section is affixed; and linkage means for hingedly intercoupling adjacent annular members to permit universal movement of each annular member with respect to adjacent annular members and to maintain the distance between adjacent annular members along the centroidal axis of said tubular section substantially constant and less than the distance between adjacent members along the surface of said tubular section, a said rubberized fabric being sufficiently stretchable to permit a portion of said tubular section to cuff over said annular members when the internal pressure exceeds the external pressure.

References Cited in the file of this patent

UNITED STATES PATENTS

| 2,410,632 | Colley et al. | Nov. 5, 1946 |
| 2,693,222 | Krupp | Nov. 2, 1954 |

FOREIGN PATENTS

| 560,270 | Great Britain | Apr. 13, 1943 |